June 13, 1933.  C. H. HAPGOOD  1,914,123
MILKING MACHINE
Filed Oct. 26, 1931
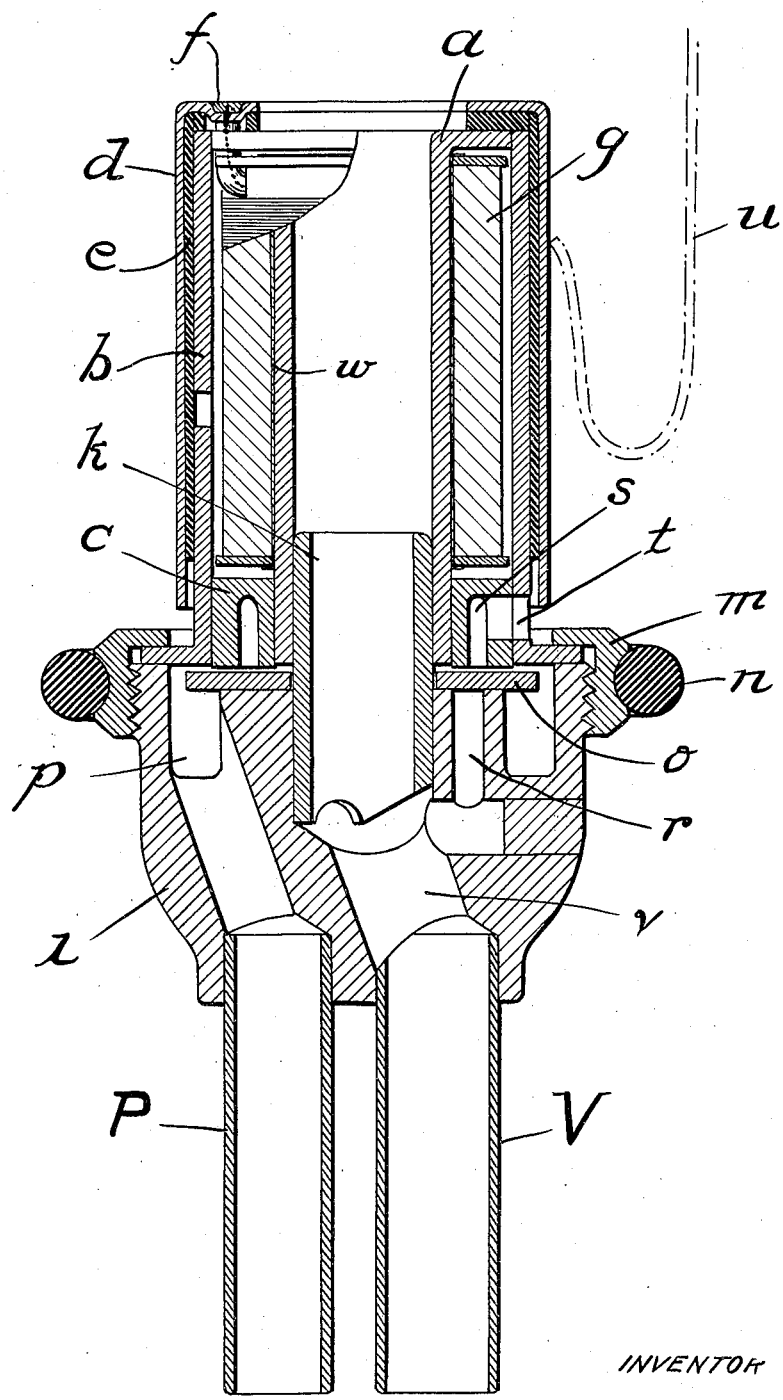
WITNESS:
Rob R Kitchel
INVENTOR
Cyrus Howard Hapgood
BY
Busser and Harding
ATTORNEYS.

Patented June 13, 1933

1,914,123

UNITED STATES PATENT OFFICE

CYRUS HOWARD HAPGOOD, OF NUTLEY, NEW JERSEY, ASSIGNOR TO THE DE LAVAL SEPARATOR COMPANY, OF NEW YORK, N. Y., A CORPORATION OF NEW JERSEY

MILKING MACHINE

Application filed October 26, 1931. Serial No. 571,169.

It is known in the art to provide a milking machine comprising double-chambered teat cups, the milk chambers of which are connected to a pail which in turn is connected with a vacuum pipe line, and the outer chambers of which are connected with a pipe in which pneumatic pulsations are produced by means of a secondary pneumatic pulsator, which in turn is actuated by pneumatic pulsations produced by a primary pneumatic pulsator that is electrically operated. Such a milking machine is disclosed in the Daysh and Hapgood Patent No. 1,405,104. It is also practicable, although not preferred, to connect the pulsation pipe from the outer teat cup chambers direct with the electrically operated pneumatic pulsator, thereby dispensing with the secondary pulsator. It is also known to operate the primary pneumatic pulsator by means of an alternately energized and de-energized electro-magnet, which operates a combined armature and valve to connect a pulsation pipe alternately with the source of vacuum and a source of higher pressure, usually the atmosphere. Such a pulsator is disclosed in the Hapgood Patents No. 1,745,092 and No. 1,816,482, wherein the pulsator is shown mounted on the milk pail.

In the said Hapgood patents the magnet pulsator is mounted over a vacuum chamber above and communicating with the milk pail. A vacuum hose extends from the vacuum pipe line to this vacuum chamber and a pulsation hose connected with the secondary pneumatic pulsator is so arranged that, in the operation of the magnet pulsator, it is connected alternately with said vacuum chamber and with atmosphere.

It has been found of decided advantage, from a commercial standpoint, to position the magnet pulsator adjacent the vacuum pipe line and to connect therewith the vacuum hose leading to the milk pail and the pulsation hose leading to the secondary pulsator (or direct to the outer teat cup chambers if no secondary pulsator be used). The magnet pulsator may be mounted on a connector which is secured to the vacuum pipe line, and the vacuum hose and the pulsation hose may be removably connected (mechanically and pneumatically) with the connector, as disclosed in prior applications filed December 24, 1927, Serial No. 242,331 and August 7, 1928, Serial No. 297,951. It is distinctly advantageous, however, from a commercial standpoint, to carry the connector carrying the magnet pulsator on the ends of the vacuum hose and pulsation hose and removably connect the same with a nozzle on the vacuum pipe. In such a system there is required but one connector for each portable milking machine unit, whereas if the connector carrying the magnet pulsator is secured to the vacuum pipe line, there must be provided as many of such connectors as there are nozzles on the vacuum pipe line.

The object of the present invention is to provide a connector carried on the ends of the vacuum hose and pulsation hose and carrying a magnet pulsator and adapted for engagement with any of the nozzles on the vacuum pipe line and when so engaged to put the magnet in the alternately open and closed electric circuit, whereby the armature valve of the magnet is operated to connect the pulsation hose alternately with the vacuum pipe line and with the atmosphere or other source of higher pressure.

The drawing is a longitudinal sectional view through the connector.

The magnet casing comprises an inner tube of steel $a$ having at its upper end an annular outwardly turned flange, an outer tube $b$ of steel and a ported annular block $c$ of bronze or other non-magnetic material between the lower ends of the two tubes. Surrounding and in part overlying the magnet casing is a tubular cover $d$ of Monel metal or other non-magnetic metal separated from the casing by insulating material $e$. One end of the magnet winding $g$, enclosed within casing $a$, $b$, extends through holes in the flanges of tubular wall $a$, insulating tube $e$ and the internal flange of the cover $d$. The cover $d$ is countersunk to provide a pocket for solder to secure the end of the magnet wire to the cover $d$. The inner end of the magnet wire is electrically connected to the metal core $w$ of the magnet winding spool.

A ported metal body $i$ carries the vacuum hose V and the pulsation hose P. Confined within and projecting above the body $i$ is a tube $k$ which has a neat fit within the tubular inner wall $a$ of the magnet casing when it is connected with the body $i$. This connection is effected by means of a ring $m$ screw threaded onto the body $i$ and having an inwardly extending flange engaging an outwardly extending flange on the lower end of the outer tubular wall $b$ of the magnet casing and confining the latter named flange against the upper marginal edge of the body $i$. The tube $k$ pneumatically connects with the vacuum hose V by means of a channel $v$ in the body $i$.

Another channel $p$ pneumatically connects the pulsation hose P with an annular valve chamber in which is positioned a disc valve $o$, which is also the armature of the magnet. This valve has a sliding fit on tube $k$, which acts as a guide to prevent the valve tilting or sticking. Ports $r$, of which one is shown in the drawing, extend from channel $v$ and open in the lower seat of valve $o$. An annular channel $s$ is formed in the block $c$; and radial ports $t$, of which one is shown in the drawing, formed partly in block $c$ and partly in tube $b$, connect channel $s$ with the atmosphere.

The connector described is adapted to be connected with the main vacuum pipe (not shown) by slipping the inner tubular wall $a$ of the magnet casing over a nozzle (not shown) on such vacuum pipe until the end of the nozzle abuts against the end of tube $k$. At the same time cover $d$ contacts with a stationarily positioned flexible contact finger $u$ connected with one pole of the electric circuit hereinbefore described, which is adapted to be intermittently opened and closed; cover $d$ being electrically connected with the magnet winding as hereinbefore described. The other terminal of the electric circuit is electrically connected with the inner end of the magnet winding through the vacuum pipe, the nozzle in the vacuum pipe, inner tube $a$ and the metal core of the magnet winding spool, as hereinbefore described.

When the electric circuit is open, the armature valve $o$ drops by gravity, and also by the superior pressure on the top of the valve, onto the lower valve seat, and atmospheric air is admitted to the pulsation hose P through ports $t$, channel $s$, the valve chamber and channel $p$. When the circuit is closed through the magnet, valve $o$ is lifted off its lower seat and seats against the face of block $c$, and pulsation hose P is connected with vacuum through channel $p$, the valve chamber and ports $r$.

The ring $m$ is provided with a peripheral recess to receive a protective rubber ring $n$.

What I claim is:

1. A connector for operatively and removably positioning an electrically operable pulsator on a vacuum pipe, which comprises a pulsation hose and a body carrying said hose, a magnet, a magnet casing mounted on said body and having a central tubular opening adapted for connection with vacuum and having also a port connected with atmosphere, said body having a vacuum channel communicating with the central opening of the magnet casing and having also a pulsation channel communicating with said pulsation hose, and an armature valve whose operation is controlled by said magnet and which is adapted to alternately connect said pulsation channel with said vacuum channel and with said atmospheric port in the magnet casing.

2. A connector for operatively and removably positioning an electrically operable pneumatic pulsator on a vacuum pipe, which comprises a pulsation hose and a body carrying said hose; a magnet casing mounted on said body and having a central tubular opening adapted for connection with vacuum and having also a valve seat and a port opening therein and communicating with atmosphere; said body having a valve seat, a vacuum channel communicating with the central tubular opening of the magnet casing, a port connecting said vacuum channel with said valve seat of the body and a channel connecting said pulsation hose with the space between said valve seats; and an armature valve between said valve seats.

3. A connector for operatively and removably positioning an electrically operable pneumatic pulsator on a vacuum pipe, which comprises a vacuum hose, a pulsation hose and a body carrying said hose; a magnet casing mounted on said body and having a central tubular opening adapted for connection with vacuum and having also a valve seat and a port opening therein and communicating with atmosphere; said body having a valve seat, a vacuum channel affording communication between the central tubular opening of the magnet casing and said vacuum hose, a port connecting said vacuum channel with said valve seat of the body and a channel connecting said pulsation hose with with the space between said valve seats; and an armature valve between said valve seats.

4. A connector for operatively and removably positioning an electrically operable pneumatic pulsator on a vacuum pipe, which comprises a pulsation hose, a ported body carrying said hose and a magnet casing and winding mounted on said body; said magnet casing comprising an open-ended inner tube, an outer tube, an annular air-ported block between the lower ends of said tubes, an outer cover, and insulation between said outer tube and cover; said magnet winding being between said tubes and electrically connected with said cover, and means controlled by the magnet to pneumatically connect the pulsation hose alternately with the vacuum pipe and the air port in said block.

5. A connector for operatively and removably positioning an electrically operable pneumatic pulsator on a vacuum pipe, which comprises a pulsation hose, a body carrying said hose, a magnet provided with a vacuum channel extending therethrough and mounted on and removably secured to said body, a tube extending into and secured to said body and extending into said vacuum channel, and means controlled by the magnet to pneumatically connect the pulsation hose alternately with said tube and channel and with the atmosphere.

6. A connector for operatively and removably positioning an electrically operated pneumatic pulsator on a vacuum pipe, which comprises a magnet casing comprising an outer tube, an inner tube affording a vacuum passage, and a block between the lower ends of the two tubes and affording a valve seat; a pulsation hose, a body carrying said hose and on which said magnet casing is mounted and having a valve seat, a vacuum passage communicating with the inner tube of the magnet casing and a passage between said vacuum passage and said valve seat on the body; and an armature valve between said valve seats; said block having a port opening in its valve seat and communicating with atmosphere.

7. A connector for operatively and removably positioning an electrically operated pneumatic pulsator on a vacuum pipe, which comprises a magnet casing comprising an outer tube, an inner tube affording a vacuum passage, and a block between the lower ends of the two tubes and affording a valve seat; a pulsation hose, a body carrying said hose and on which said magnet casing is mounted and having a valve seat, a vacuum passage communicating with the inner tube of the magnet casing and a passage between said vacuum passage and the valve seat of the body; and an armature valve between said valve seats; said block having an annular air passage opening in its valve seat and radially extending ports opening in its outer wall, the outer magnet casing tube having ports aligning with the radial ports in said block.

8. A connector for operatively and removably positioning an electrically operated pneumatic pulsator on a vacuum pipe, which comprises a magnet having a lower outwardly extending flange and a central air passage, air hose and a ported body carrying said hose, said body having an external wall abutting against said flange and a recessed central portion affording a valve seat, a ring threaded on the external wall of the body and confining said flange against said wall and thereby securing the magnet to said body, said ring having a peripheral recess, a protective rubber ring confined in said recess, and a valve in operative relation with said valve seat and whose operation is controlled by said magnet to control the flow of air through said ported body and hose.

9. A connector for operatively and removably positioning an electrically operated pneumatic pulsator on a vacuum pipe, which comprises air hose and a ported body carrying the same and provided with a valve seat, a magnet casing comprising an outer tube secured to the body, an inner tube and a block of non-magnetic material between the lower ends of said tubes, means securing said outer tube to said body; said block affording a valve seat, and an armature valve between said valve seats, said inner and outer tubes terminating short of said block to prevent contact of the valve therewith when seated on said block.

10. A connector for operatively and removably positioning an electrically operable pneumatic pulsator on a vacuum pipe, which comprises air hose, a ported body carrying said hose; a magnet comprising an outer tube secured to said body and an inner tube affording a vacuum passage, an outer cover, insulation between said outer tube and cover, and a magnet winding between said tubes and extending through said outer tube and insulation and in electrical connection with said cover; a contact finger with which said cover, when in operative position, contacts; and means controlled by the magnet to control the flow of air through said hose, ported body and inner tube.

11. A connector for operatively and removably positioning an electrically operable pneumatic pulsator on a vacuum pipe, which comprises pneumatic hose and a body carrying same and provided with a ported valve seat, a tube carried by the body and surrounded by said valve seat, a magnet casing secured to said body and provided with a ported valve seat and comprising also an inner tube engaging the tube carried by the body, said tubes affording a pneumatic passage, and a combined disc armature and valve having a sliding fit on the first named tube and guided thereby in its movement between said valve seats.

In testimony of which invention, I have hereunto set my hand, at city of New York, New York, on this 16th day of October, 1931.

CYRUS HOWARD HAPGOOD.